US012617940B2

(12) United States Patent
Terauchi et al.

(10) Patent No.: US 12,617,940 B2
(45) Date of Patent: May 5, 2026

(54) CURABLE COMPOSITION AND CURED MATERIAL

(71) Applicant: Cosmo Oil Lubricants Co., Ltd., Tokyo (JP)

(72) Inventors: Ryuji Terauchi, Saitama (JP); Yusuke Kato, Saitama (JP); Masaaki Kondo, Saitama (JP); Takuya Goto, Tokyo (JP)

(73) Assignee: Cosmo Oil Lubricants Co., Ltd., Tokyo (JP)

( * ) Notice: Subject to any disclaimer, the term of this patent is extended or adjusted under 35 U.S.C. 154(b) by 1066 days.

(21) Appl. No.: 17/422,502

(22) PCT Filed: Jan. 8, 2020

(86) PCT No.: PCT/JP2020/000307
§ 371 (c)(1),
(2) Date: Jul. 13, 2021

(87) PCT Pub. No.: WO2020/149193
PCT Pub. Date: Jul. 23, 2020

(65) Prior Publication Data

US 2022/0089855 A1 Mar. 24, 2022

(30) Foreign Application Priority Data

Jan. 15, 2019 (JP) ................................ 2019-004626
Sep. 13, 2019 (JP) ................................ 2019-167701

(51) Int. Cl.
*C08L 33/08* (2006.01)

(52) U.S. Cl.
CPC ......... *C08L 33/08* (2013.01); *C08L 2205/025* (2013.01)

(58) Field of Classification Search
CPC .......................... C08L 33/08; C08L 2205/025
See application file for complete search history.

(56) References Cited

U.S. PATENT DOCUMENTS 9,802,294 B2 * 10/2017 Yang ...................... B24D 3/002

FOREIGN PATENT DOCUMENTS

| | | | | | |
|---|---|---|---|---|---|
| JP | 2005-048124 | A | | 2/2005 | |
| JP | 2006-096986 | A | | 4/2006 | |
| JP | 5105134 | B2 | | 12/2012 | |
| JP | 2013-072020 | A | | 4/2013 | |
| JP | 2013-124289 | A | | 6/2013 | |
| JP | 2013-129814 | A | | 7/2013 | |
| JP | 2014-088506 | A | | 5/2014 | |
| JP | 2014-132049 | A | | 7/2014 | |
| JP | 2014-167117 | A | | 9/2014 | |
| JP | 2016-188297 | A | | 11/2016 | |
| JP | 2018-089957 | A | | 6/2018 | |
| TW | 201416407 | A | | 5/2014 | |
| WO | 2013/047145 | A1 | | 4/2013 | |
| WO | WO-2014069178 | A1 | * | 5/2014 | ................ C09J 4/00 |

OTHER PUBLICATIONS

English machine translation of JP 2013-129814. (Year: 2013).*
English machine translation of WO 2014-069178. (Year: 2014).*
English machine translation of JP 2014-132049. (Year: 2014).*
English machine translation of JP 2016-188297. (Year: 2016).*
Nov. 13, 2020 (WO)—Third Party Observation PCT/JP2020/000307.
Aug. 15, 2023 (TW) Office Action Taiwanese Patent Application No. 109101126.
Oct. 28, 2025 (EP) European Office Action Patent Application No. 20741629.8.

* cited by examiner

*Primary Examiner* — Angela C Scott
(74) *Attorney, Agent, or Firm* — Banner & Witcoff, Ltd.

(57) ABSTRACT

A curable composition and a cured material containing: a compound (A) having one (meth)acrylate group in one molecule; a compound (B) having two or more (meth) acrylate groups in one molecule; a polymerization initiator (C); a dispersant (D); and a thermally conductive filler (E) containing zinc oxide.

9 Claims, No Drawings

CURABLE COMPOSITION AND CURED MATERIAL

CROSS-REFERENCE TO RELATED APPLICATIONS

This application is a National Stage Application under 35 U.S.C. 371 of co-pending PCT application number PCT/JP2020/000307 designating the United States and filed Jan. 8, 2020, which claims the benefit of JP application number 2019-004626 and filed Jan. 15, 2019 and JP application number 2019-167701 and filed Sep. 13, 2019, each of which are hereby incorporated by reference in their entireties.

TECHNICAL FIELD

The present disclosure relates to a curable composition and a cured material.

BACKGROUND ART

In recent years, due to significant performance improvement in arithmetic elements and light-emitting elements, there has been significant improvement in performance of electronic devices such as personal computers, mobile phones, and personal digital assistants (PDAs) and lighting and display devices such as light-emitting diodes (LEDs) and electronic luminescent (EL) devices. The performance improvement in arithmetic elements and light-emitting elements causes a marked increase in heating value, and how to dissipate heat in electronic devices and in lighting and display devices is a key challenge.

To transmit heat generated by an arithmetic element or a light-emitting element to a heat radiator without loss and to dissipate the heat through the heat radiator, a thermal interface material (TIM) is disposed between a heat generator and the heat radiator as a measure for the heating. Known examples of the heat radiator include heat sinks, and known examples of the heat generator include central processing units (CPUs) and large-scale integrations (LSIs). In regard to the TIM, typically used examples include heat dissipation sheets, thermally conductive greases, and gap fillers. Among these examples, gap fillers are standing out because of the following property. That is, gap fillers are liquid during the early stage, and after application, gap fillers are cured and changed into a solid.

As a gap filler obtained by filling a thermally conductive filler into a silicone resin, for example, Japanese Patent Application Laid-Open (JP-A) No. 2006-96986 discloses a hydrosilylation-curable thermally conductive silicone elastomer composition containing a hydrosilylation-curable organopolysiloxane composition, a reinforcing silica fine powder, a thermally conductive inorganic powder, and an alkylphenyl polysiloxane which is liquid at normal temperature.

As the gap filler, for example, International Publication No. 2014/080931 discloses a heat dissipation structure including: (A) a printed circuit board; (B) a heat generator; (C) an electromagnetic shield case; (D) a rubbery thermally conductive resin layer having tensile elasticity of 50 MPa or less and thermal conductivity of 0.5 W/mK or more; and (E) a thermally nonconductive layer having thermal conductivity of less than 0.5 W/mK. The structure is characterized in that the heat generator (B) is disposed on the printed circuit board (A) and that the structure is provided with the heat generator (B) and the thermally conductive resin layer (D).

For example, Japanese Patent No. 5105134 discloses a thermally conductive composition containing components (A) to (C), in which the component (B) is contained in an amount of from 0.01 to 10% by weight with respect to the component (A), the component (C) is contained in an amount of from 50 to 97% by weight with respect to the entire composition, and a thermal polymerization initiator is not contained.

(A) Component: Compound containing one or more (meth)acrylate groups and one or more isocyanate groups in one molecule (B) Component: Photopolymerization initiator (C) Component: Thermally conductive filler For example, Japanese Patent Application Laid-Open (JP-A) 2005-48124 discloses a resin composition for a heat dissipation material, including a liquid resin containing a (meth)acrylic polymer (A), a polymerizable monomer (B), and a plasticizer (C) as essential components. A cured material of the liquid resin has hardness of from 5 to 70.

SUMMARY OF INVENTION

Technical Problem

A silicone-based resin contained in the thermally conductive silicone elastomer disclosed in JP-A No. 2006-96986 remains concerned about a contact failure of an electronic component due to a low-molecular-weight siloxane component or the like and about an outflow of the silicone-based resin to the outside of the system over extended periods of use.

TIMs play a role in transferring heat of heat generating components. Therefore, TIMs change in temperature along with temperature changes of surrounding components. This is why TIMs are required not to decrease in thermal conductivity when TIMs change in temperature while being sandwiched between components.

In addition, substances increase in volume or the like along with temperature increase, but the coefficient (coefficient of linear expansion) varies depending on materials, which causes dimensional mismatch between components and causes a stress to members. When a temperature change occurs to such an extent that volumes of components around a TIM become larger than that of the TIM, the TIM may be pulled and peeled from the components. The peeling of the TIM severely impairs thermal conductance of the TIM. Conversely, when the TIM expands due to a temperature change and becomes larger in volume than the components around the TIM, a stress is applied to the components around the TIM, and the components around the TIM may break. This is why TIMs are required to have flexibility.

In addition, TIMs are required to have a stable shape (hereinafter also referred to as "shape stability") even with a temperature change.

These are reasons why attention is given to gap fillers as TIMs, which are liquid during the early stage, and then, cured and changed into a solid after application.

As a result of intensive studies, the inventors have found that the thermally conductive compositions disclosed in JP-A No. 2006-96986, International Publication No. 2014/080931, and Japanese Patent No. 5105134 do not satisfy any of flexibility, shape stability, and thermal conductance. Furthermore, the resin composition for a heat dissipation material disclosed in JP-A No. 2005-48124 is intended to be used in a heat dissipation sheet. However, the inventors have found that the resin composition for a heat dissipation material satisfies none of flexibility, shape stability, and thermal conductance when being applied to a gap filler or the like.

An object of an embodiment of the disclosure is to provide a curable composition or a cured material thereof excellent in flexibility, shape stability, and thermal conductance.

An object of another embodiment of the disclosure is to provide a curable composition or a cured material thereof that enables the resulting cured material to exhibit an excellent ability to suppress changes in thermal conductivity at a high temperature.

Solution to Problem

The disclosure includes the following embodiments.

<1> A curable composition, containing:

a compound (A) having one (meth)acrylate group in one molecule;

a compound (B) having two or more (meth)acrylate groups in one molecule;

a polymerization initiator (C);

a dispersant (D); and a thermally conductive filler (E) containing zinc oxide.

<2> A curable composition, containing:

a compound (A) having one (meth)acrylate group in one molecule;

a compound (B) having two or more (meth)acrylate groups in one molecule;

a polymerization initiator (C);

a dispersant (D); and a thermally conductive filler (E) containing magnesium oxide.

<3> The curable composition according to <2>, in which the thermally conductive filler (E) further includes zinc oxide.

<4> The curable composition according to <2> or <3>, in which a content of the magnesium oxide with respect to a total mass of the thermally conductive filler (E) is from 10% by mass to 70% by mass.

<5> The curable composition according to any one of <1> to <4>, in which the compound (A) includes a compound represented by the following general formula (1).

General formula (1)

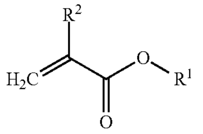

In the general formula (1), $R^1$ represents an alkyl group having from 10 to 50 carbon atoms, and $R^2$ represents a hydrogen atom or a methyl group.

<6> The curable composition according to any one of <1> to <5>, in which the compound (B) includes a compound represented by the following general formula (2).

General formula (2)

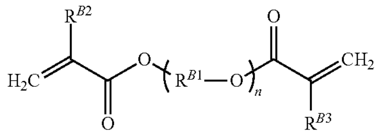

In the general formula (2), $R^{B1}$ represents an alkylene group having from 1 to 5 carbon atoms, each of $R^{B2}$ and $R^{B3}$ independently represents a hydrogen atom or a methyl group, and n is an integer of 4 or more.

<7> The curable composition according to any one of <1> to <6>, in which the dispersant (D) includes at least one compound selected from the group consisting of a polyglycerin monoalkyl ether compound, a compound having a carboxy group, and a metallic soap.

<8> The curable composition according to any one of <1> to <7>, further containing a plasticizer (F).

<9> The curable composition according to <8>, in which the plasticizer (F) includes an acrylic polymer having a glass transition temperature of −20° C. or lower.

<10> The curable composition of <8>, in which the plasticizer (F) includes a trimellitic acid ester.

<11> The curable composition according to any one of <1> to <10>, a content of the compound (B) is from 0.5 parts by mass to 10 parts by mass with respect to 100 parts by mass of the compound (A).

<12> The curable composition according to any one of <1> to <11>, in which a content of the thermally conductive filler (E) is from 70% by mass to 98% by mass with respect to a total mass of the curable composition.

<13> A cured material, including the curable composition according to any one of <1> to <12> after curing.

Advantageous Effects of Invention

According to an embodiment of the disclosure, there is provided a curable composition or a cured material thereof excellent in flexibility, shape stability, and thermal conductance.

According to another embodiment of the disclosure, there is provided a curable composition or a cured material thereof that enables the resulting cured material to exhibit excellent ability to suppress changes in thermal conductivity at a high temperature.

DESCRIPTION OF EMBODIMENTS

Hereinafter, modes for carrying out the disclosure will be described in detail.

Herein, the term “to” or the symbol “-” representing a numerical range indicates that the range includes both of the upper limit and the lower limit. When only a unit of the upper limit is described in the numerical range represented by “to”, it should be noted that the lower limit is in the same unit.

Herein, when a composition includes a plurality of substances corresponding to each component, a rate of content or an amount of each component contained in the composition represents the total rate of content or the total amount of the plurality of substances in the composition unless otherwise specified.

Furthermore, in regard to the numerical range herein, the upper limit or the lower limit described in a certain numerical range may be replaced with a value shown in Examples.

Herein, the term "(meth)acryl" is used as a concept including both acryl and methacryl, and the term "(meth) acryloyl" is used as a concept including both acryloyl and methacryloyl.

In the disclosure, the term "% by mass" is used as a synonym for "% by weight", and the term "parts by mass" is used as a synonym for "parts by weight".

Furthermore, in the disclosure, when a composition includes a plurality of components, each component contained in the composition represents the total amount of the plurality of components contained in the composition unless otherwise specified.

Still further, in the disclosure, a combination of two or more preferred embodiments is a more preferred embodiment.

(Curable Composition)

A curable composition according to the disclosure contains: a compound (A) having one (meth)acrylate group in one molecule; a compound (B) having two or more (meth) acrylate groups in one molecule; a polymerization initiator (C); a dispersant (D); and a thermally conductive filler (E) containing zinc oxide.

With such a configuration, the curable composition according to the disclosure is excellent in flexibility, shape stability, and thermal conductance.

The mechanism by which those effects are obtained is unknown but is inferred to be as follows.

The curable composition according to the disclosure contains the compound (A) having one (meth)acrylate group in one molecule, the compound (B) having two or more (meth)acrylate groups in one molecule, the polymerization initiator (C), the dispersant (D), and the thermally conductive filler (E) containing zinc oxide. Therefore, the curable composition is inferred to be superior in flexibility to a gap filler obtained by filling a thermally conductive filler into an epoxy resin because the curable composition contains the compounds (A) and (B) and the dispersant (D). Furthermore, the curable composition of the disclosure is inferred to be excellent in shape stability because the curable composition contains the compounds (A) and (B), the polymerization initiator (C), and zinc oxide as the thermally conductive filler (E), which imparts moderate hardness to the curable composition and suppresses softening of the curable composition associated with an external temperature change. Still further, the curable composition of the disclosure is inferred to be excellent in thermal conductance because the curable composition contains zinc oxide as the thermally conductive filler (E).

A curable composition according to the disclosure contains: a compound (A) having one (meth)acrylate group in one molecule; a compound (B) having two or more (meth) acrylate groups in one molecule; a polymerization initiator (C); a dispersant (D); and a thermally conductive filler (E) containing magnesium oxide.

In a case where a curable composition in the related art used for a gap filler such as the thermally conductive compositions disclosed in Japanese Patent No. 5105134 and JP-A No. 2005-48124 or the resin composition for a heat dissipation material disclosed in JP-A No. 2005-48124 is applied to a gap filler, thermal impedance may be increased (that is, thermal conductivity is decreased), when the gap filler is cured and then left to stand at a high temperature of, for example, 150° C.

As a result of intensive studies, the present inventors have found that a curable composition containing a compound (A) having one (meth)acrylate group in one molecule, a compound (B) having two or more (meth)acrylate groups in one molecule, a polymerization initiator (C), a dispersant (D), and a thermally conductive filler (E) containing magnesium oxide enables excellent thermal conductivity, particularly, ability to suppress changes in thermal conductance at a high temperature (hereinafter may be referred to as "ability to suppress changes in thermal conductance").

The mechanism by which those effects are obtained is unknown but is inferred to be as follows.

In the disclosure, the high temperature represents a temperature of 150° C. or higher.

Since the curable composition according to the disclosure contains the compounds (A) to (E) and, in particular, contains magnesium oxide as the thermally conductive filler (E), it is possible to adjust the hardness of the post-cured curable compound to an appropriate range due to the hardness of the magnesium oxide itself. Accordingly, a cured material of the curable compound is less likely to deform at a high temperature, and a contact interface between the curable composition and a heat radiator or a heat generator is small. Therefore, the curable composition is inferred to be superior, in terms of an ability to suppress changes in thermal conductance at a high temperature, to cured materials of the thermally conductive compositions disclosed in International Publication No. 2014/080931 and Japanese Patent No. 5105134 or to a cured material of the resin composition for a heat dissipation material disclosed in JP-A No. 2005-48124, which do not contain magnesium oxide as the thermally conductive filler (E).

In addition, the cured material of the curable compound according to the disclosure is inferred to have durability since the cured material is less likely to deform even at a high temperature owing to the hardness of the magnesium oxide.

In addition, since the curable composition according to the disclosure includes all of the compound (A), the compound (B), the polymerization initiator (C), the dispersant (D), and the thermally conductive filler (E), it is inferred that the post-cured curable composition has moderate adhesiveness and is likely to have excellent adhesiveness and reworkability with respect to, for example, aluminum or glass contained in a heat generator, a heat radiator, or the like.

Hereinafter, each configuration of the curable composition according to the disclosure is described.

<Compound (A)>

The curable composition according to the disclosure contains the compound (A) having one (meth)acrylate group in one molecule.

The compound (A) having one (meth)acrylate group in one molecule is not particularly limited. Examples of the compound (A) include straight, branched, or cyclic alkyl (meth)acrylates and acrylic acid.

From the viewpoint of achieving both thermostability and flexibility, the compound (A) having one (meth)acrylate group in one molecule is preferably a straight or branched alkyl (meth)acrylate, and more preferably a compound represented by the following general formula (1).

General formula (1)

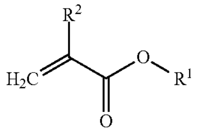

In the general formula (1), $R^1$ represents an alkyl group having from 10 to 50 carbon atoms, and $R^2$ represents a hydrogen atom or a methyl group.

In the general formula (1), the alkyl group in $R^1$ may be straight or branched. The alkyl group may have a substituent.

Examples of the substituent include a carboxy group, a hydroxy group, an amino group, an aryl group, a heterocyclic group, or the like. Among these examples, a carboxy group or a hydroxy group is preferable, and a hydroxy group is more preferable.

Form the viewpoint of achieving both thermostability and flexibility, the total number of carbon atoms of the alkyl group in $R^1$ is preferably from 2 to 30, more preferably from 5 to 25, still more preferably from 10 to 25, and particularly preferably from 12 to 24.

When the alkyl group includes a substituent having carbon atoms, the expression "the total number of carbon atoms" indicates that the number includes the number of carbon atoms in the substituent.

From the viewpoint of achieving both thermostability and flexibility, $R^1$ in Formula (1) is preferably a straight or branched alkyl group having 2 to 30 carbon atoms in total or an alkyl group having 2 to 30 carbon atoms in total and having a substituent, more preferably a straight or branched alkyl group having 2 to 25 carbon atoms in total or an alkyl group having 2 to 25 carbon atoms in total and having a hydroxy group, and preferably a straight or branched unsubstituted alkyl group having 12 to 24 carbon atoms.

Examples of the compound (A) include lauryl (meth) acrylate, isostearyl (meth)acrylate, tetradecyl (meth)acrylate, hexadecyl (meth)acrylate, octadecyl (meth)acrylate, 2-hydroxyethyl (meth)acrylate, 4-hydroxybutyl (meth)acrylate, 2-hydroxybutyl (meth)acrylate, and 2-decyltetradecyl (meth)acrylate.

$R^2$ is a hydrogen atom or a methyl group. From the viewpoint of achieving both thermostability and flexibility, $R^2$ is preferably a methyl group.

—Content—

A content of the compound (A) is preferably from 1% by mass to 10% by mass and more preferably from 2% by mass to 8% by mass with respect to a total mass of the curable composition.

The compound (A) is preferably a monomer having a molecular weight of less than 1,000.

The monomer herein represents a polymerizable compound having a molecular weight of less than 1,000, and a polymerizable polymer represents a polymerizable compound having a weight-average molecular weight (Mw) of 1000 or more.

The concept of the "polymerizable polymer" in the disclosure includes what is called oligomers.

<Compound (B)>

The curable composition according to the disclosure contains the compound (B) having two or more (meth) acrylate groups in one molecule.

The curable composition may contain one kind of the compound (B) independently or may contain two or more kinds thereof.

Examples of the compound having two or more (meth) acrylate groups in one molecule include hexanediol di(meth) acrylate, butanediol di(meth)acrylate, 1,3-butanediol di(meth)acrylate, 1,4-butanediol di(meth)acrylate), ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, and trimethylolpropane tri(meth)acrylate.

From the viewpoint of achieving both thermostability and flexibility, the compound (B) is preferably a compound having two and/or three (meth)acrylate groups in one molecule, more preferably a compound having two (meth) acrylate groups in one molecule, and still more preferably a compound represented by the following general formula (2).

General formula (2)

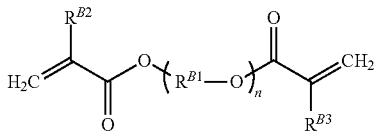

In the general formula (2), $R^{B1}$ represents an alkylene group having from 1 to 5 carbon atoms, each of $R^{B2}$ and $R^{B3}$ independently represents a hydrogen atom or a methyl group, and n is an integer of 4 or more.

The alkylene group having from 1 to 5 carbon atoms represented by $R^{B1}$ may be straight or branched.

From the viewpoint of flexibility, the alkylene group represented by $R^{B1}$ is preferably a branched alkylene group having from 2 to 5 carbon atoms, more preferably a straight or branched alkylene group having from 2 to 4 carbon atoms, and still more preferably a branched alkylene group having 3 or 4 carbon atoms.

It is preferable that $R^{B2}$ and $R^{B3}$ are independently a methyl group.

n is preferably from 4 to 25, more preferably from 4 to 10, and still more preferably from 4 to 8.

From the viewpoints of flexibility and shape stability, in the general formula (2), $R^{B1}$ is preferably a branched alkylene group having from 2 to 5 carbon atoms (more preferably a straight or branched alkylene group having from 2 to 4 carbon atoms, and still more preferably a branched alkylene group having 3 or 4 carbon atoms), $R^{B2}$ and $R^{B3}$ are preferably a methyl group, and n is preferably from 4 to 25 (more preferably 4 to 10 and still more preferably from 4 to 8).

—Content—

A content of the compound (B) is preferably from 0.5 parts by mass to 10 parts by mass and more preferably from 1 part by mass to 5 parts by mass with respect to 100 parts by mass of the compound (A) from the viewpoints of flexibility and shape stability.

<Polymerization Initiator (C)>

The curable composition according to the disclosure contains the polymerization initiator (C).

The polymerization initiator (C) may be selected from a known thermal polymerization initiator or a known photopolymerization initiator, that is, a compound that generates polymerization initiating species such as radicals and cations by energy of light, heat, or both.

From the viewpoint of reactivity of the compounds (A) and (B), the polymerization initiator (C) is preferably a radical polymerization initiator, more preferably a peroxide that generates free radicals by heat, and still more preferably an organic peroxide that generates free radicals by heat.

Examples of the organic peroxide include isobutyl peroxide, α,α' bis(neodecanoylperoxy)diisopropylbenzene, cumyl peroxyneodecanoate, di-n-propyl peroxydicarbonate, di-s-butyl peroxydicarbonate, 1,1,3,3-tetramethylbutyl peroxyneodecanoate, bis(4-t-butylcyclohexyl) peroxydicarbonate, 1-cyclohexyl-1-methylethyl peroxyneodecanoate, di-2-ethoxyethyl peroxydicarbonate, di(ethylhexyl) peroxydicarbonate, t-hexyl peroxyneodecanoate, dimethoxybutyl peroxydicarbonate, di(3-methyl-3-methoxybutyl) peroxydicarbonate, t-butyl peroxyneodecanoate, t-hexyl peroxypivalate, 3,5,5-trimethylhexanoyl peroxide, octanoyl peroxide, lauroyl peroxide, stearoyl peroxide, 1,1,3,3-tetramethylbutyl peroxy-2-ethylhexanoate, succinic peroxide, 2,5-dimethyl-2,5-di(2-ethylhexanoyl) hexane, 1-cyclohexyl-1-methylethyl peroxy-2-ethylhexanoate, t-hexyl peroxy-2-ethylhexanoate, 4-methyl benzoyl peroxide, t-butyl peroxy-2-ethylhexanoate, m-toluoyl benzoyl peroxide, benzoyl peroxide, t-butyl peroxyisobutyrate, 1,1-bis(t-butylperoxy)2-methylcyclohexane, 1,1-bis(t-hexylperoxy)-3,3,5-trimethylcyclohexane, 1,1-bis(t-hexylperoxy) cyclohexane, 1,1-bis(t-butylperoxy)-3,3,5-trimethylcyclohexane, 1,1-bis(t-butylperoxy) cyclohexanone, 2,2-bis(4,4-dibutyl peroxy cyclohexyl) propane, 1,1-bis(t-butylperoxy) cyclododecane, t-hexyl peroxy isopropyl monocarbonate, t-butylperoxy maleic acid, t-butylperoxy-3,5,5-trimethylhexanoate, t-butyl peroxylaurate, 2,5-dimethyl-2,5-di(m-toluoyl peroxy) hexane, t-butyl peroxyisopropyl monocarbonate, t-butylperoxy-2-ethylhexyl carbonate, t-hexyl peroxybenzoate, 2,5-dimethyl-2,5-di(benzoylperoxy) hexane, t-butyl peroxyacetate, 2,2-bis(t-butylperoxy) butane, t-butyl peroxybenzoate, n-butyl-4,4-bis(t-butylperoxy) valerate, di-t-butyl peroxyisophthalate, α,α' bis(t-butylperoxy) diisopropylbenzene, dicumyl peroxide, 2,5-dimethyl-2,5-di(t-butylperoxy) hexane, t-butylcumyl peroxide, di-t-butyl peroxide, p-menthane hydroperoxide, 2,5-dimethyl-2,5-di(t-butylperoxy) hexine, diisopropylbenzene hydroperoxide, t-butyl trimethylsilyl peroxide, 1,1,3,3-tetramethylbutyl hydroperoxide, cumene hydroperoxide, t-hexyl hydroperoxide, t-butyl hydroperoxide, benzoyl peroxide, and lauroyl peroxide.

Among these examples, from the viewpoint of reactivity, the organic peroxide is preferably at least one compound selected from the group consisting of benzoyl peroxide, t-butylperoxy-2-ethylhexyl carbonate, 1,1,3,3-tetramethylbutyl peroxy-2-ethylhexanoate, and cumene hydroperoxide.

—Content—

A content of the polymerization initiator (C) is preferably from 0.5 parts by mass to 10 parts by mass and more preferably from 0.5 parts by mass to 4 parts by mass with respect to 100 parts by mass of the compound (A) from the viewpoints of flexibility, shape stability, and ability to suppress changes in thermal conductance.

<Dispersant (D)>

The curable composition according to the disclosure contains the dispersant (D).

The dispersant is not particularly limited. Examples of the dispersant include anionic surfactants, cationic surfactants, nonionic surfactants, amphoteric surfactants, polymeric surfactants, alcohols, compounds having a carboxy group such as fatty acids, metallic soaps, fatty acid oligomer compounds, fluorine-based surfactants, and boron-based surfactants.

Among these dispersants, the dispersant (D) is preferably at least one compound selected from the group consisting of a nonionic surfactant, a compound having a carboxy group, and a metallic soap.

Examples of the nonionic surfactant include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyglycerin fatty acid ether, polyglycerin monoalkyl ether, sucrose fatty acid ester, polyoxyethylene alkylamine, polyethylene glycol polypropylene glycol block copolymer, acetylene glycol, and polyoxyethylene adduct of acetylene glycol.

The compound having a carboxy group is not particularly limited and may be a fatty acid having one carboxy group and a hydrocarbon group in one molecule or may be a compound having two or more carboxy groups in one molecule.

Examples of the compound having a carboxy group include an aromatic carboxylic acid and a fatty acid having an aliphatic hydrocarbon group having from 12 to 22 carbon atoms.

Examples of the fatty acid having an aliphatic hydrocarbon group having from 12 to 22 carbon atoms include stearic acid, palmitic acid, myristic acid, and lauric acid.

Furthermore, examples of the compound having a carboxy group include polyvalent carboxylic acids (polycarboxylic acids) having two or more carboxy groups in one molecule such as oxalic acid, malonic acid, succinic acid, fumaric acid, maleic acid, and adipic acid; polycarboxylic acid salts such as alkylamine salts and alkylammonium salts of polycarboxylic acids, polycarboxylic acid polyaminoamide, polycarboxylic acid sodium salts, polycarboxylic acid ammonium salts, and polycarboxylic acid amino alcohol salts; and polycarboxylic acid-based copolymers.

Examples of the polycarboxylic acid compound include alkylamine salts and alkylammonium salts of polycarboxylic acids, polycarboxylic acid polyaminoamide, polycarboxylic acid sodium salts, polycarboxylic acid ammonium salts, and polycarboxylic acid amino alcohol salts.

Examples of the metallic soap include metallic salts of higher fatty acids such as calcium stearate, potassium oleate, and calcium oleate.

From the viewpoint of flexibility, the dispersant (D) preferably contains at least one compound selected from the group consisting of a polyglycerin monoalkyl ether compound, a compound having a carboxy group, and a metallic soap, more preferably at least one compound selected from the group consisting of a polyglycerin monoalkyl ether compound and a fatty acid having an aliphatic hydrocarbon group having from 12 tO 22 carbon atoms, and still more preferably at least one compound selected from the group consisting of a polyglycerin monoalkyl ether compound and a fatty acid having an unsaturated hydrocarbon roup having from 18 to 22 carbon atoms.

—Content—

A content of the dispersant (D) is preferably 0.5 parts by mass or more and 10 parts by mass or less, more preferably from 1 part by mass to 5 parts by mass, still more preferably from 1.5 parts by mass to 4 parts by mass, and particularly preferably from 1.5 parts by mass to 3 parts by mass with respect to 100 parts by mass of the compound (A) from the viewpoints of flexibility, shape stability, and ability to suppress changes in thermal conductance.

<Thermally Conductive Filler (E)>

The curable composition according to the disclosure contains the thermally conductive filler (E) including zinc oxide.

The zinc oxide applied as the thermally conductive filler is not particularly limited and may be one typically used as a thermally conductive filler.

The zinc oxide included in the thermally conductive filler preferably has a volume average particle diameter of from 0.05 μm to 100 μm and more preferably from 0.1 μm to 50 μm to achieve both flexibility and high conductivity.

From the viewpoint of high conductivity, the zinc oxide preferably has a volume average particle diameter of 30 μm or more and more preferably from 30 μm to 50 μm.

The curable composition according to the disclosure preferably contains two or more kinds of zinc oxide having different volume average particle diameters, so that the thermally conductive filler is highly filled into the composition.

When the thermally conductive filler (E) containing zinc oxide contains a compound other than the zinc oxide, a content of the compound other than the zinc oxide is preferably 50% by mass or less, more preferably 30% by mass or less, and still more preferably 10% by mass or less with respect to the total mass of the thermally conductive filler (E) including the zinc oxide.

When the curable composition according to the disclosure contains two or more kinds of zinc oxide having different volume average particle diameters, from the above viewpoint, a ratio of a maximum volume average particle diameter to a minimum volume diameter is preferably 50 times or more.

The minimum volume average particle diameter and the maximum volume average particle diameter indicate a minimum volume average particle diameter and a maximum volume average particle diameter determined from a volume distribution obtained by the measurement of volume average particle diameters described below.

In addition, from a similar viewpoint, it is more preferable that the curable composition according to the disclosure contains two or more kinds of zinc oxide having different volume average particle diameters in a range of from 0.05 μm to 100 μm and that a difference in volume average particle diameter is 5 μm or more.

The curable composition according to the disclosure contains the thermally conductive filler (E) including magnesium oxide.

The magnesium oxide used as the thermally conductive filler is not particularly limited and may be one typically used as a thermally conductive filler.

The magnesium oxide has a volume average particle diameter of preferably 30 μm or more, more preferably from 30 μm to 100 μm, and still more preferably from 40 μm to 65 μm from the viewpoint of ability to suppress changes in thermal conductance.

One kind of magnesium oxide may be used singly, or two or more kinds thereof may be used in combination.

An amount of the magnesium oxide is preferably from 5% by mass to 100% by mass, more preferably from 10% by mass to 70% by mass, and still more preferably from 20% by mass to 50% by mass with respect to the total mass of the thermally conductive filler (E) from the viewpoint of ability to suppress changes in thermal conductance.

The thermally conductive filler (E) contained in the curable composition according to the disclosure preferably includes both magnesium oxide and zinc oxide from the viewpoint of shape stability of a resulting cured material.

The zinc oxide used as the thermally conductive filler is not particularly limited and may be one typically used as a thermally conductive filler. Particularly, the aforementioned zinc oxide is preferable from the viewpoint of shape stability of a resulting cured material. When the thermally conductive filler (E) includes both magnesium oxide and zinc oxide, the aspect is similar to the aforementioned preferred aspect of the zinc oxide.

When the curable composition according to the disclosure contains both magnesium oxide and zinc oxide as the thermally conductive filler (E), a content of zinc oxide (the total amount of zinc oxide when two or more kinds of zinc oxide are contained) is preferably from 50% by mass to 90% by mass, more preferably from 60% by mass to 80% by mass, and still more preferably from 65% by mass to 75% by mass with respect to a total mass of the thermally conductive filler (E), from the viewpoints of flexibility, shape stability, and ability to suppress changes in thermal conductance.

When the curable composition according to the disclosure contains both magnesium oxide and zinc oxide as the thermally conductive filler (E), a content ratio of magnesium oxide to zinc oxide (magnesium oxide: zinc oxide) in the thermally conductive filler (E) is preferably from 5:1 to 1:5, and more preferably from 1:1 to 1:4 on mass basis, from the viewpoints of flexibility, shape stability, and ability to suppress changes in thermal conductance.

The volume average particle diameter is calculated as a volume average particle diameter (50% diameter) from a value (volume distribution) measured at a laser wavelength of 405 nm with, for example, a particle size distribution measurement device (Product name; NANO PARTICLE SIZE ANALYZER SALD-7500 NANO, available from Shimadzu Corporation).

When the curable composition according to the disclosure contains two or more kinds of zinc oxide having different volume average particle diameters, a content of zinc oxide having a maximum volume average particle diameter determined in the volume distribution is preferably 50% by mass or more with respect to the total mass of the zinc oxide contained in the thermally conductive filler (E).

The magnesium oxide and the zinc oxide contained in the thermally conductive filler (E) preferably have two or more peaks in the volume distribution, so that the thermally conductive filler is highly filled into the composition.

The volume distribution is determined in a similar manner to the volume average particle diameter of the zinc oxide.

—Content—

A content of the thermally conductive filler (E) is preferably 50% by mass or more, more preferably from 70% by mass to 98% by mass, and still more preferably from 85% by mass to 98% by mass with respect to a total mass of the composition.

The content of the thermally conductive filler (E) represents a total amount of magnesium oxide, zinc oxide, and compounds other than the magnesium oxide and the zinc oxide.

The curable composition according to the disclosure may contain a compound other than the magnesium oxide and the zinc oxide as the thermally conductive filler (E).

Examples of the compound other than the zinc oxide include aluminum hydroxide and carbon.

When the thermally conductive filler (E) includes the compound other than the magnesium oxide and the zinc oxide, a content of the compound other than the magnesium oxide and the zinc oxide is preferably 10% by mass or less, more preferably 5% by mass or less, and still more preferably 1% by mass or less with respect to a total mass of the thermally conductive filler (E).

<<Plasticizer (F)>>

The curable composition according to the disclosure may further contain the plasticizer (F).

One kind of the plasticizer (F) may be used singly, or two or more kinds thereof may be used in combination.

The plasticizer (F) is not particularly limited. Examples of the plasticizer (F) include polymers used as plasticizers, fatty acid ester compounds having an unsaturated hydrocarbon group, aromatic carboxylic acid ester compounds, and oils containing a fatty acid having an unsaturated hydrocarbon group and an aromatic carboxylic acid.

The "polymers" herein represent compounds having a weight-average molecular weight (Mw) of 1,000 or more.

The concept of "polymers" herein also includes what is called oligomers.

Examples of the polymers include an acrylic polymer, a polyester-based polymer, a polyurethane-based polymer, and a silicone polymer. From the viewpoints of thermostability and flexibility, an acrylic polymer is preferable.

When the curable composition according to the disclosure contains the plasticizer (F) which is a polymer, from the viewpoints of thermostability and flexibility, the polymer is preferably one having a glass transition temperature of −20° C. or less and more preferably an acrylic polymer having a glass transition temperature of −20° C. or less.

When the curable composition according to the disclosure contains the plasticizer (F) which is a polymer, from the viewpoints of thermostability and flexibility, the polymer is preferably one having a glass transition temperature of from −90° C. to −20° C. and more preferably an acrylic polymer having a glass transition temperature of from −90° C. to −20° C.

The glass transition temperature (Tg) of the polymer is determined by examining an inflection point of a DSC curve measured with a differential scanning calorimetry (DSC).

Examples of the fatty acid ester compounds having an unsaturated hydrocarbon group include ester compounds such as palmitoleic acid, oleic acid, linoleic acid, and linolenic acid.

Examples of the aromatic carboxylic acid ester compounds include ester compounds such as phthalic acid, terephthalic acid, benzoic acid, and trimellitic acid.

When the curable composition according to the disclosure contains the plasticizer (F), from the viewpoint of high-temperature stability, the plasticizer (F) preferably contains an aromatic carboxylic acid ester compound and preferably contains a trimellitic acid ester.

—Content—

When the curable composition according to the disclosure contains the plasticizer (F), to achieve both thermostability and flexibility, a content of the plasticizer (F) (the total amount when two or more kinds of plasticizers (F) are contained) is preferably from 10 parts by mass to 60 parts by mass, more preferably from 20 parts by mass to 50 parts by mass, and still more preferably from 30 parts by mass to 45 parts by mass with respect to 100 parts by mass of the compound (A).

<<Reductant (G)>>

The curable composition according to the disclosure may further contain a reductant (G) if necessary. When the curable composition according to the disclosure is applied to a two-component curable composition (to be described), one curable composition preferably contains the reductant (G).

Addition of the reductant (G) promotes decomposition of the polymerization initiator (C) (for example, peroxide) and easily proceeds a polymerization reaction even at a low temperature.

The reductant (G) is not particularly limited as long as the reductant (G) can promote decomposition of the polymerization initiator (C). Examples of the reductant (G) include known reductants used in combination with polymerization initiators. In order to promote decomposition of the polymerization initiator (C), the reductant (G) is preferably a metal compound-based reductant.

One kind of the reductant (G) may be used singly, or two or more kinds thereof may be used in combination.

Examples of the metal compound-based reductant include stannous oxide, dioctyltin dilaurate, dibutyltin dilaurate, dibutyltin diacetate, zinc naphthenate, antimony trichloride, potassium olate, sodium O-phenylphenate, bismuth nitrate, ferric chloride, tetra-n-butyltin, tetra(2-ethylhexyl) titanate, cobalt 2-ethylhexoate, and iron(II) 2-ethylhexoate.

Among these examples, cobalt 2-ethylhexoate and cobalt naphthenate are preferable as the metal compound-based reductant from the viewpoint of reactivity.

—Content—

When the curable composition according to the disclosure contains the reductant (G), a content of the reductant (G) is preferably from 0.5 parts by mass to 10 parts by mass and more preferably from 2 parts by mass to 9 parts by mass with respect to 100 parts by mass of the compound (A) from the viewpoint of a curing rate.

<<Other Additives>>

The curable composition according to the disclosure may contain, if necessary, components other than the compound (A), the compound (B), the polymerization initiator (C), the dispersant (D), the thermally conductive filler (E), the plasticizer (F), and the reductant (G) (hereinafter may be referred to as "other additives").

As other additives, a corrosion inhibitor, a rust inhibitor, or the like can be blended in an appropriate manner.

Among these examples, one kind of additive may be used or two or more kinds of additives may be used in combination.

Examples of the corrosion inhibitor include benzotriazole, tolyltriazole, thiadiazole, and benzimidazole.

Examples of the rust inhibitor include sulfonic acid metallic salt-based compounds and sorbitan compounds.

The curable composition according to the disclosure may be a two-component curable composition in which two types of curable compositions are mixed when being applied to a substrate, a heat generator, or the like.

The curable composition according to the disclosure preferably has unworked penetration of from 100 to 500 and more preferably from 200 to 400 from the viewpoints of flexibility, shape stability, and ability to suppress changes in thermal conductance.

The unworked penetration is determined in accordance with JIS-K 2220 (2013).

[Method of Producing Curable Composition]

A method of producing the curable composition according to the disclosure is not particularly limited. The curable composition according to the disclosure can be produced, for example, by the following method.

The compound (A), the compound (B), the polymerization initiator (C), the dispersant (D), and the thermally conductive filler (E), and if necessary, the plasticizer (F), the reductant (G), and other additives are put in a stirring container, and then, stirred and mixed to obtain a curable composition.

A known stirrer or the like can be used for the stirring and mixing.

In the method of producing the curable composition, when other additives are added, the additives may be stirred in a time frame within which the additives can be dissolved or dispersed and may be added to the stirring container together with the compounds (A) to (D) or may be added after the compounds (A) to (D) are added.

(Cured Material)

The cured material according to the disclosure is a cured material of the above curable composition. A method of curing the curable composition is not limited and can be appropriately selected from commonly used techniques. Examples of the curing include irradiating with an active energy ray and heating, but heating is preferable.

When the curable composition is cured by heating, the heating temperature is preferably 60° C. or higher and more preferably 70° C. or higher. The heating time is preferably from one minute to 120 minutes.

Alternatively, the curable composition may be cured by a reaction with moisture in the air or may be cured at room temperature.

The cured material according to the disclosure preferably has thermal conductivity of from 0.5 (W/(m·K)) to 50 (W/(m·K)) and preferably from 1 (W/(m·K)) to 20 (W/(m·K)) from the viewpoints of flexibility, shape stability, and ability to suppress changes in thermal conductance.

Softness on the Shore 00 scale of the cured material according to the disclosure is preferably 100 or less and more preferably 85 or less from the viewpoint of ability to suppress changes in thermal conductance.

Softness of the cured material according to the disclosure is determined in accordance with ASTM D2240.

<Application>

The curable composition according to the disclosure can be suitably used as, for example, a TIM to be filled into a recess (a gap between a heat generator and a heat radiator) formed in a substrate.

Since the curable composition according to the disclosure has excellent flexibility, shape stability, and thermal conductance, the curable composition exhibits excellent adaptability to a surface to which the curable composition is to be applied, such as a recess formed on a substrate. Accordingly, the curable composition can efficiently release heat even when the substrate has parts with different heights. Since the curable composition according to the disclosure also exhibits a superior ability to suppress changes in thermal conductance at a high temperature, it is possible to release heat efficiently even when the substrate has parts with different heights. In addition, the curable composition can adapt to unevenness of a microscopic material on a substrate, and it is possible to efficiently release heat. Furthermore, the curable composition can be suitably employed as a gap filler due to its excellent adaptability to a surface to which the curable composition is to be applied even with temperature changes.

EXAMPLE

Hereinafter, the present invention will be specifically described with reference to Examples. Note that the invention is in no way limited by the following Examples.

Examples 1 to 8 and 10 and Comparative Examples 1 to 3

Each raw material was blended in an amount shown in Table 1 or 3 and mixed with a planetary centrifugal mixer (Product name; AWATORI RENTARO ARV-310, available from Thinky Corporation) at 2,000 rpm (revolutions per minute) for two minutes at atmospheric pressure, thereby preparing a curable composition.

Example 9

Each raw material of liquid A and liquid B was blended in an amount shown in Table 1 and mixed with a planetary centrifugal mixer (Product name; AWATORI RENTARO ARV-310, available from Thinky Corporation) at 2,000 rpm for two minutes at atmospheric pressure to obtain the liquid A and the liquid B. Then, the liquid A and the liquid B were blended at a mass ratio of 1:1 and mixed with a planetary centrifugal mixer (Product name; AWATORI RENTARO ARV-310, available from Thinky Corporation) at 2,000 rpm for one minute at atmospheric pressure, thereby preparing a two-component curable composition.

The curable compositions prepared in Examples 1 to 10 and Comparative Examples 1 to 3 were evaluated in the following manner.

—Evaluation—

<Thermal Conductivity (W/(m·K))>

Thermal conductivity was measured in accordance with ASTM D5470.

Each curable composition was molded to a size of 10 mm×10 mm×1 mm and the upper and lower parts of each curable composition were sandwiched between 10 mm×10 mm copper plates. Then, each composition was cured under the curing conditions shown in Table 2 or Table 3, thermal impedance (unit; K·cm$^2$/W) was measured with a thermal impedance measuring device (Product name; THERMAL IMPEDANCE MEASURING DEVICE, available from Tsukuba Rika Seiki) and converted to thermal conductivity.

<Fluidity Before Curing: Unworked Penetration>

The unworked penetration of each curable composition before curing was measured in accordance with JIS-K 2220 (2013). The larger the unworked penetration, the softer the curable composition. Conversely, the smaller the unworked penetration the harder the curable composition.

<Flexibility>

—Softness after Curing: Bending Test—

Each curable composition was molded to a size of 50 mm×20 mm×1 mm and cured under the curing conditions shown in Table 2 or Table 3. After a cured material of each curable composition was held in such a manner that both ends were parallel to each other, a force was applied to a central portion in the longitudinal direction so as to dent the center of the cured material by 1 mm. When the central portion was dented in the vertical direction by 1 mm from the height of both ends, the cured material was observed. Cured materials with a crack were graded "A", while cured materials with no crack were graded "B."

<Shape Stability>

—Softness after Curing: Hardness on Shore OO Scale (Sample Thickness; 6 mm)—

The softness of the cured material of each curable composition was measured in accordance with ASTM D2240.

Each curable composition was molded to a size of 50 mm×20 mm×6 mm (thickness 6 mm) and cured under the curing conditions shown in Table 2 or Table 3, and then, the hardness on the Shore 00 scale was measured with a durometer (Product name; GS-754G, available from Teclock Co. Ltd.).

<Thermal Conductance>

—Ratio of Thermal Conductivity Before and After Heat Shock Test—

Each post-cured curable composition (cured material) after the measurement of thermal conductivity was sandwiched between copper plates and placed in a small thermal shock test chamber (Product name; TSE-11, available from Espec Corporation), and a heat shock test was performed under the following conditions. After 500 cycles, each cured material was taken out from the small thermal shock test chamber, and the thermal conductivity of each cured material was calculated in a similar manner to the aforementioned measurement of thermal conductivity, thereby determining a ratio of thermal conductivity after the heat shock test to thermal conductivity before the heat shock test ((thermal conductivity after test)/(thermal conductivity before test)).

—Setup Temperatures—

Low temperature; −35° C., 30 min

High temperature; 125° C., 30 min

Number of cycles; 500

<Ability to Suppress Changes in Thermal Conductance at High Temperature>

A ratio of thermal conductivity at a time point after a 1000-hour heat shock test at 150° C. to thermal conductivity before the heat shock test ((thermal conductivity after test)/(thermal conductivity before test)) was determined in a similar manner to the method of determining a ratio of thermal conductivity before and after the heat shock test except that a forced convection oven (Model number: DRN 420 DB, available from Advantec Toyo Kaisha, Ltd.) was used instead of the small thermal shock test chamber, and that the setup temperature was changed to the following conditions during the heat shock test.

In regard to the ratio of the thermal conductivity at the time point after the 1000-hour test at 150° C. to the thermal conductivity before the test, the closer the ratio is to 1, the more excellent the ability of the curable material to suppress changes in thermal conductance at a high temperature. A ratio of 0.5 or more falls within a range acceptable as a product, but a ratio of 0.8 or more shows an excellent ability to suppress changes in thermal conductance.

—Setup Conditions—

High temperature; 150° C.

Still standing time; 1000 hours

<Reworkability>

An aluminum substrate or a glass epoxy resin substrate with a size of 80 mm×50 mm×1 mm was prepared. On the plate, each curable composition was molded to a size of 50 mm×20 mm×2 mm and cured under the curing conditions shown in Table 2 or Table 3. After that, each cured material was peeled in a direction at 90-degree angle with a force of 10 N.

A cured material that peeled away at the interface between the aluminum substrate or the glass epoxy resin substrate was graded "A", and a cured material that did not peel away was graded "B".

<Adhesiveness>

On an aluminum substrate or glass epoxy resin substrate with a size of 80 mm×50 mm×1 mm, each curable composition was molded to a size of 50 mm×20 mm×2 mm and cured under the curing conditions shown in Table 2 or Table 3. At the time of applying a load of 5 kg (49 N) to the end part of each cured material, a cured material that did not peel away was ranked "A", and a cured material that peeled away was graded "B."

TABLE 1

| | | | Example 1 | Example 2 | Example 3 | Example 4 | Example 5 | Example 6 | Example 7 | Example 8 |
|---|---|---|---|---|---|---|---|---|---|---|
| Curable composition | Compound (A) (part by mass) | Lauryl methacrylate | 100 | 100 | — | — | 100 | 50 | 50 | — |
| | | Isostearyl methacrylate | — | — | 100 | — | — | — | — | — |
| | | 2-Hydroxyethyl methacrylate | — | — | — | — | — | 50 | — | — |
| | | 2-Hydroxybutyl methacrylate | — | — | — | — | — | — | 50 | — |
| | | 2-Decyltetradecyl methacrylate | — | — | — | 100 | — | — | — | 100 |
| | Compound (B) (part by mass) | Polypropylene glycol dimethacrylate | 2.1 | 2.1 | 2.1 | — | 2.1 | 2.1 | 2.1 | 2.0 |
| | | Trimethylolpropane trimethacrylate | — | — | — | 0.85 | — | — | — | — |
| | Dispersant (D) (part by mass) | Oleic acid (9-octadecenoic acid) | 2.0 | 2.0 | 2.0 | 2.0 | 2.0 | 2.0 | 2.0 | 2.0 |
| | | Monooleyl glyceryl ether | — | — | — | — | — | — | — | — |
| | Polymerization initiator (C) (part by mass) | Benzoyl peroxide | 0.95 | 0.95 | 0.95 | — | — | — | — | — |
| | | t-Butylperoxy-2-ethylhexyl carbonate | — | — | — | — | 1.9 | 2.6 | 1.9 | — |
| | | 1,1,3,3-Tetramethylbutyl peroxy-2-ethylhexanoate | — | — | — | 1.5 | — | — | — | 1.5 |
| | | Cumene hydroperoxide | — | — | — | — | — | — | — | — |
| | Reductant (G) (part by mass) | Hexoate cobalt | — | — | — | — | — | — | — | — |

TABLE 1-continued

| | | | | | | | | | |
|---|---|---|---|---|---|---|---|---|---|
| Plasticizer (F) (part by mass) | Acrylic polymer | — | 40 | 40 | — | 40 | — | 40 | — |
| | Trimellitic acid mixed straight alkyl | — | — | — | 40 | — | 40 | — | 40 |
| Thermally conductive filler (E) | Filling factor (% by mass) | 92.5 | 92.5 | 90 | 90 | 95 | 92.5 | 90 | 90 |
| | Zinc oxide (Grade 1) (D50; 10 μm) | 35 | 35 | 35 | 20 | 20 | 35 | 35 | 20 |
| | Calcined zinc oxide (D50; 10 μm) | 65 | 65 | 65 | 50 | 50 | 65 | 65 | 50 |
| | LPZINC (D50; 50 μm) | — | — | — | 30 | 30 | — | — | 30 |

| | | | Example 9 | | Comparative | Comparative | Comparative |
|---|---|---|---|---|---|---|---|
| | | | Liquid A | Liquid B | Example 1 | Example 2 | Example 3 |
| Curable composition | Compound (A) (part by mass) | Lauryl methacrylate | — | — | 100 | 100 | — |
| | | Isostearyl methacrylate | — | — | — | — | — |
| | | 2-Hydroxyethyl methacrylate | — | — | — | — | — |
| | | 2-Hydroxybutyl methacrylate | — | — | — | — | — |
| | | 2-Decyltetradecyl methacrylate | 100 | 100 | — | — | 100 |
| | Compound (B) (part by mass) | Polypropylene glycol dimethacrylate | 3.0 | 3.0 | 2.1 | 2.1 | — |
| | | Trimethylolpropane trimethacrylate | — | — | — | — | 40 |
| | Dispersant (D) (part by mass) | Oleic acid (9-octadecenoic acid) | — | — | — | 2.0 | 2.0 |
| | | Monooleyl glyceryl ether | 2.0 | 2.0 | — | — | — |
| | Polymerization initiator (C) (part by mass) | Benzoyl peroxide | — | — | 0.95 | 0.95 | — |
| | | t-Butylperoxy-2-ethylhexyl carbonate | — | — | — | — | — |
| | | 1,1,3,3-Tetramethylbutyl peroxy-2-ethylhexanoate | — | — | — | — | — |
| | | Cumene hydroperoxide | 2.0 | — | — | — | — |
| | Reductant (G) (part by mass) | Hexoate cobalt | — | 5.0 | — | — | — |
| | Plasticizer (F) (part by mass) | Acrylic polymer | — | — | 40 | 40 | — |
| | | Trimellitic acid mixed straight alkyl | 40 | 40 | — | — | — |
| | Thermally conductive filler (E) | Filling factor (% by mass) | 92.5 | 92.5 | 92.5 | 92.5 | 92.5 |
| | | Zinc oxide (Grade 1) (D50; 10 μm) | 35 | 35 | 35 | Boron nitride D50 (4 μm): 35%, D50 (12 μm): 65% | 35 |
| | | Calcined zinc oxide (D50; 10 μm) | 65 | 65 | 65 | | 65 |
| | | LPZINC (D50; 50 μm) | — | — | — | | — |

TABLE 2

| | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|
| Curing conditions | | 90° C./30 min | 90° C./30 min | 90° C./30 min | 80° C./30 min | 110° C./30 min | 110° C./30 min | 110° C./30 min | 80° C./30 min | 25° C./24 hours | N/A | N/A | 25° C./24 hours |
| Evaluation | Thermal conductivity (W/(m · K)) | 3.8 | 3.7 | 2.6 | 2.4 | 4.9 | 2.8 | 2.2 | 2.4 | 2.9 | | | 1.5 |
| | Fluidity before curing: unworked penetration | 309 | 264 | 332 | 340 | 264 | 234 | 290 | 350.25 | 339 | | | — |
| | Flexibility (bending test) | A | A | A | A | A | A | A | A | A | | | B |
| | Shape stability (Shore OO) | 98 | 91 | 77 | 56 | 94.6 | 100 or more | 98 | 59.2 | 93 | | | 100 or more |
| | Thermal conductance (ratio of thermal conductivity before and after heat shock test) | 0.95 | 0.95 | 0.95 | 0.90 | 0.97 | 0.93 | 0.94 | 0.94 | 0.90 | | | 0.80 |
| | Reworkability (with respect to aluminum substrate) | A | A | A | A | A | B | B | A | A | | | B |
| | Reworkability (with respect to glass epoxy resin substrate) | A | A | A | A | A | B | B | A | A | | | B |
| | Adhesiveness (to aluminum substrate) | B | B | B | B | B | A | A | B | B | | | A |
| | Adhesiveness (to glass epoxy resin substrate) | B | B | B | B | B | A | A | B | B | | | A |

TABLE 3

| | | | Example 10 |
|---|---|---|---|
| Curable composition | Compound (A) (part by mass) | 2-Decyltetradecyl methacrylate (ITEC) | 100 |
| | Compound (B) (part by mass) | Polypropylene glycol dimethacrylate (9PG) | 2.0 |
| | Dispersant (D) (part by mass) | 9-Octadecenoic acid | 2.0 |
| | Polymerization initiator (C) (part by mass) | 1,1,3,3-Tetramethylbutyl peroxy-2 ethyl hexanoate | 1.5 |
| | Plasticizer (F) (part by mass) | Trimellitic acid mixed straight alkyl (C-880) | 40 |
| | Thermally conductive filler (E) | Filling factor (% by mass) | 90 |
| | | Zinc oxide (Grade 1) (% by mass, D50, 0.6 μm) | 20 |
| | | Calcined zinc oxide (% by mass, D50, 10 μm) | 50 |
| | | LPZINC (% by mass, D50, 50 μm) | — |
| | | Magnesium oxide (% by mass, D50, 56 μm) | 30 |
| | Curing conditions | | 75° C./40 min<br>80° C./30 min<br>90° C./20 min |
| Evaluation | Thermal conductivity (W/(m · K)) | | 3.5 |
| | Fluidity before curing: unworked penetration | | 335 |
| | Shape stability (Shore OO) | | 66 |
| | Reworkability (with respect to aluminum substrate) | | A |
| | Reworkability (with respect to glass epoxy resin substrate) | | A |
| | Adhesiveness (to aluminum substrate) | | B |
| | Adhesiveness (to glass epoxy resin substrate) | | B |
| | Flexibility (bending test) | | A |
| | Thermal conductance (ratio of thermal conductivity before and after heat shock test) | | 0.94 |
| | Ability to suppress changes in thermal conductance at high temperature | | 1 |

Hereinafter, details of each component shown in Tables 1 to 3 are described. In Tables 1 to 3, the symbol "-" indicates that the corresponding component is not contained or the corresponding evaluation is not performed.

In Tables 1 and 3, numerical values in the columns of zinc oxide (Grade 1), calcined zinc oxide, LPZINC, and magnesium oxide contained in the thermally conductive filler (E) are % by mass with respect to the total mass of the thermally conductive filler (E). For example, "35" of zinc oxide (Grade 1) and "65" of calcined zinc oxide of Example 1 in Table 1 indicate that 35% by mass of zinc oxide (Grade 1) and 65% by mass of calcined zinc oxide are contained with respect to the total mass of the thermally conductive filler (E).

For example, zinc oxide (Grade 1): 20, calcined zinc oxide: 50, and magnesium oxide: 30 of Example 10 in Table 3 indicate that 20% by mass of zinc oxide (Grade 1), 50% by mass of calcined zinc oxide, and 30% by mass of magnesium oxide are contained with respect to the total mass of the thermally conductive filler (E).

<<Compound (A)>>

Lauryl methacrylate; Product name; LMA, available from Kyoeisha Chemical Co., Ltd.

Isostearyl methacrylate; Product name; ISM, available from Shin-Nakamura Chemical Co., Ltd.

2-hydroxyethyl methacrylate; Product name; HO-250(N), available from Kyoeisha Chemical Co., Ltd.

2-hydroxybutyl methacrylate; Product name; HOB(N), available from Kyoeisha Chemical Co., Ltd.

2-decyltetradecyl methacrylate (ITEC); Product name; ITEC, available from Shin-Nakamura Chemical Co., Ltd.

<<Compound (B)>>

Polypropylene glycol dimethacrylate (9PG); Product name; 9PG, available from Shin-Nakamura Chemical Co., Ltd.

Trimethylolpropane trimethacrylate; Product name; LIGHT ESTER TMP, available from Kyoeisha Chemical Co., Ltd.

<<Dispersant (D)>>

9-octadecenoic acid (oleic acid), available from NOF Corporation

Monooleyl glyceryl ether; Product name; NIKKOL SELACHYL ALCOHOL, available from Nippon Surfactant Industries Co., Ltd.

<<Polymerization Initiator (C)>>

Benzoyl peroxide; Product name; BENZOYL PEROXIDE, available from NOF Corporation t-butyl peroxy-2-ethylhexyl carbonate; Product name; PERBUTYL E, available from NOF Corporation 1,1,3,3-tetramethylbutyl peroxy-2-ethylhexanoate; Product name; PEROCTA 0, available from NOF Corporation Cumene hydroperoxide; Product name; KAYACUMENE H, available from Kayaku Akzo Corporation <<Reductant (G)>>

Hexoate cobalt, available from TOEI Chemical Industry Co., Ltd.

<<Plasticizer (F)>>

Acrylic polymer; Product name; UP-1171, available from Toagosei Co., Ltd., weight-average molecular weight; 8,000, glass transition temperature (Tg); −57° C.

Trimellitic acid mixed straight alkyl ester; Product name; C-880, available from Adeka Corporation.

<<Thermally Conductive Filler (E)>>

Zinc oxide (Grade 1); volume average particle diameter D50; 0.6 μm, available from Sakai Chemical Industry Co., Ltd.

Calcined zinc oxide; volume average particle diameter D50; 10 μm, available from HakusuiTech Co., Ltd.

LPZINC; volume average particle diameter D50; 50 μm, available from Sakai Chemical Industry Co., Ltd.

Magnesium oxide: volume average particle diameter D50; 56 μm, available from Denka Company Limited In Table 1, “Boron nitride D50 (4 μm): 35%, D50 (12 μm): 65%” indicates that, in Comparative Example 2, 35% by mass of boron nitride having a volume average particle diameter D50 (4 μm) and 65% by mass of boron nitride having a volume average particle diameter D50 (12 μm) were blended as the thermally conductive filler with respect to the total mass of boron nitride.

The results of Table 2 show that the cured materials formed from the curable compositions of Examples 1 to 9 are superior in flexibility, shape stability, and thermal conductance to the cured materials formed from the curable compositions of Comparative Example 1 to 3. The results of Table 3 show that the cured material formed from the curable composition of Example 10 is particularly excellent in ability to suppress changes in thermal conductance at a high temperature. The results also show that the cured material formed from the curable composition of Example 10 is excellent in flexibility, shape stability, and thermal conductance.

In this manner, the curable composition and the cured material according to the disclosure can be suitably used as a gap filler.

The disclosures of Japanese Patent Application No. 2019-004626 filed on Jan. 15, 2019 and Japanese Patent Application No. 2019-167701 filed on Sep. 13, 2019 are incorporated herein by reference in their entirety.

All publications, patent applications and technical standards referred to herein are incorporated by reference in their entirety to the same extent as if each individual publication, patent application or technical standard was specifically and individually indicated to be incorporated by reference in its entirety.

The invention claimed is:

1. A curable composition, comprising:

a compound (A) having one (meth)acrylate group in one molecule;

a compound (B) having two or more (meth)acrylate groups in one molecule;

a polymerization initiator (C);

a dispersant (D); and a thermally conductive filler (E) containing magnesium oxide, wherein the dispersant (D) comprises at least one compound selected from the group consisting of a polyglycerin monoalkyl ether compound, a compound having a carboxy group, and a metallic soap, wherein a content of the dispersant (D) is from 1.5 parts by mass to 3 parts by mass with respect to 100 parts by mass of the compound (A), wherein the thermally conductive filler (E) further contains zinc oxide, wherein when the thermally conductive filler (E) contains a compound other than the magnesium oxide and the zinc oxide, the content of the compound other than the magnesium oxide and the zinc oxide is 10% by mass or less relative to the total mass of the thermally conductive filler (E), wherein a content of the magnesium oxide with respect to a total mass of the thermally conductive filler (E) is from 10% by mass to 70% by mass.

2. The curable composition according to claim 1, wherein the compound (A) comprises a compound represented by the following general formula (1):

General formula (1)

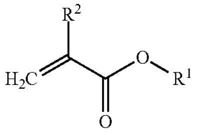

wherein, in the general formula (1), $R^1$ represents an alkyl group having from 10 to 50 carbon atoms, and $R^2$ represents a hydrogen atom or a methyl group.

3. The curable composition according to claim 1, wherein the compound (B) comprises a compound represented by the following general formula (2):

General formula (2)

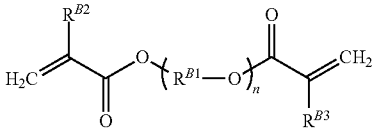

wherein, in the general formula (2), $R^{B1}$ represents an alkylene group having from 1 to 5 carbon atoms, each of $R^{B2}$ and $R^{B3}$ independently represents a hydrogen atom or a methyl group, and n is an integer of 4 or more.

4. The curable composition according to claim 1, further comprising a plasticizer (F).

5. The curable composition according to claim 4, wherein the plasticizer (F) comprises an acrylic polymer having a glass transition temperature of −20° C. or lower.

6. The curable composition of claim 4, wherein the plasticizer (F) comprises a trimellitic acid ester.

7. The curable composition according to claim 1, wherein a content of the compound (B) is from 0.5 parts by mass to 10 parts by mass with respect to 100 parts by mass of the compound (A).

8. The curable composition according to claim 1, wherein a content of the thermally conductive filler (E) is from 70% by mass to 98% by mass with respect to a total mass of the curable composition.

9. A cured material, comprising the curable composition according to claim 1 after curing.

* * * * *